J. O. Norton.
Corn Harvester.
N° 36668     Patented Oct. 14, 1862.

Witnesses.     Inventor.
Wm Staehle.     Joel O. Norton
George Murray

UNITED STATES PATENT OFFICE.

JOEL O. NORTON, OF WILTON, ILLINOIS.

IMPROVEMENT IN HARVESTERS FOR BROOM-CORN.

Specification forming part of Letters Patent No. 36,668, dated October 14, 1862.

*To all whom it may concern:*

Be it known that I, JOEL O. NORTON, of Wilton, in the county of Will and State of Illinois, have invented a new and useful Machine for Harvesting Broom-Corn; and I do hereby declare the following to be a full and exact description of the same, reference being had to the accompanying drawings, making part of this specification, in which—

Figure 1:
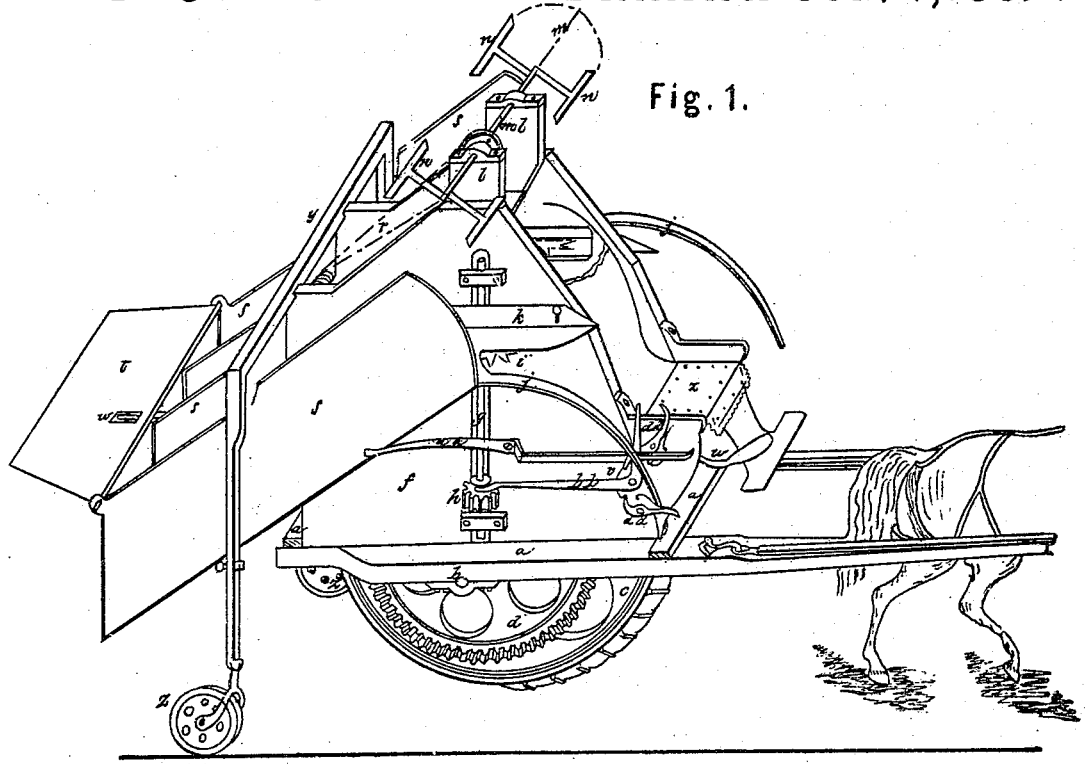
Figure 2:
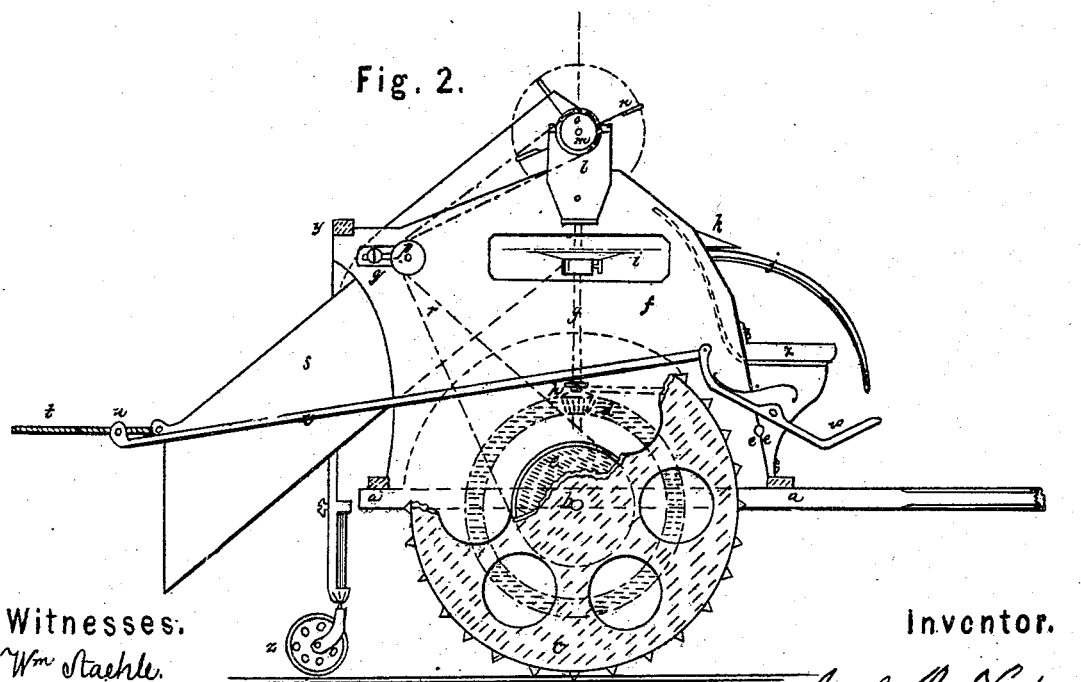

Figure 1 is a perspective view of the said machine. Fig. 2 is a longitudinal section thereof.

Similar letters of reference indicate corresponding parts in both views.

The subject of my invention is a machine adapted to cut broom-corn at any desired height and deposit it in gavels upon the ground, as will be hereinafter explained.

To enable others skilled in the art to which my invention appertains to make and use the same, I will proceed to describe its construction and operation.

$a$ represents a square main frame, in which is journaled an axle, $b$, secured to a large central driving-wheel, $c$, so placed that almost the entire weight of the machine will rest upon the said wheel. The shaft $b$ carries at each end a bevel-gear wheel, $d$, and near one end a band-pulley, $e$.

$f$ is a frame or body mounted upon the horizontal main frame $a$, to support the operating parts hereinafter described.

I will now proceed to describe the operating parts of one side of the machine, so far as they are alike on both sides, excepting in so far as some are made "right and left."

$g$ is a shaft journaled on the outside of the frame $f$, in a vertical position, immediately above the shaft $b$.

$h$ is a pinion working upon a feather upon the lower end of the shaft $g$ in such a manner as to be rotated by the said shaft, but have an independent vertical play thereon for the purpose of throwing it in or out of gear with the wheel $d$ on the shaft $b$. The pinion is elevated to throw it out of gear by means of a clutch-lever, $b\ b$, resting in a collar on the said pinion.

$i$ is a cutter mounted upon a feather at the upper end of the shaft $g$, so as to be adjustable in height upon the said shaft while rotated thereby. The said cutter consists of a disk or flange with V-shaped sickle-knives riveted to its upper side, and a hub projecting downward, with a set-screw to secure it at any height.

$j$ is a gathering-bar secured to the frame $f$, beneath and slightly in the rear of the cutter $i$. The said gathering-bar bends out from the frame under the cutter, and is provided with a finger at top, forming a slot in which the cutter $i$ works, affording a support to the plants while being cut. The gathering-bar projects forward and outward, and bends down at its front end to gather in all the fallen corn.

$k$ is an adjustable shield covering the outside part of the cutter $i$, excepting the space of a few teeth, so as to guide the plants to the cutter and prevent the ears from being cut to pieces.

A discharging-box, $s$, is fastened obliquely to the frame $f$, sloping backward at an angle of about forty degrees to the horizon. Its upper end is fitted beneath the cutter $i$ and gathering-bar $j$ in such a position as to receive the plants as they are cut. The gathering is assisted by a horizontal reel, $n$. A guide, $a\ a$, is attached beneath the gathering-bar $j$—at its front end to the frame $f$ and at its rear end to the box $s$—to prevent the standing stalks from catching on the latter. So far the two sides of the machine may be of similar construction.

$l$ is a small frame mounted adjustably in the upper part of the frame $f$, and secured at any height by means of set-screws. In the said frame is journaled the reel-shaft $m$, to the outer ends of which the reels $n$ are attached. The shaft $m$ is driven by a belt, $r$, extending from the pulley $e$ upon the main shaft $b$ to the pulley $o$ upon the shaft $m$. The belt $r$ passes around a pair of loose pulleys, $p$, mounted upon a sliding bar, $q$, so as to tighten the said belt and prevent its interference with the cutting apparatus.

$t$ is a shutter hinged to the rear end of the boxes, and held in a closed position by means of a connecting-rod, $v$, from the foot-lever $w$. In order to discharge the cut corn in suitable gavels, the said shutter is permitted to open by releasing the lever $w$. The weight of the corn will then cause it to discharge itself upon the ground; or the opening of the shutter may be assisted by a suitable spring.

To balance or support the machine from falling over backward, a cross-bar, $y$, is attached to the upper part of the frame $f$ at a suitable height to pass over the standing stalks, and caster-wheels $z$ are mounted on vertical shafts depending from the said bar $y$.

The apparatus for throwing the pinions $h$ in and out of gear consists of a shaft, $e\ e$, extending across the frame beneath the driver's seat $x$, and provided with clutch-levers $b\ b$, taking into collars on the pinions $h$, as before explained. The clutch-lever $b\ b$ on the right side has a handle extending upward in convenient proximity to the seat, as shown. The pinions may be held in or out of gear by spring-pawls $d\ d$, taking into a ratchet-wheel, $c\ c$, upon the shaft $e\ e$. The driver's seat $x$ is mounted upon the front of the frame $f$ at such a height as to afford the driver convenient control of the horse or horses and the machine.

Operation: The cutters $i$ are first adjusted to a suitable height—about five feet from the ground, more or less, as the height of the corn may require. The gathering-bars $j$ and shields $k$ are then adjusted to the cutter and secured by set-screws. The reel-frame $l$ is then set at proper height, and the belt $r$ tightened by means of the pulleys $p$. The driver then takes his seat upon the seat $x$, throws the pinions $h$ in gear, and puts the machine in motion, governing the discharge of corn by his right foot upon the lever $w$. By this means two rows of corn may be readily cut at once and deposited neatly in gavels upon the ground.

What I claim as new, and desire to secure by Letters Patent, is—

1. The combination of the horizontal main frame $a$, driving-wheel $c$, vertical frame $f$, and rear support, $y\ z$, constructed and arranged as and for the purposes set forth.

2. The combination of the cutters $i$, gatherers $j$, shield $k$, and discharging-boxes $s$, when arranged to operate substantially as and for the purposes explained.

3. The self-opening shutter $t$, connecting-rod $v$, and foot-lever $w$, when used in the manner described, to control the discharge of corn from the inclined boxes $s\ s$.

JOEL O. NORTON.

Witnesses:
　WM. STAEHLE,
　FRANCIS L. CAGNIN.